(12) United States Patent
Suzuki et al.

(10) Patent No.: US 7,164,487 B2
(45) Date of Patent: *Jan. 16, 2007

(54) COMMUNICATION TERMINAL (75) Inventors: Yuji Suzuki, Toyonaka (JP); Satoshi Fukui, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 879 days.

This patent is subject to a terminal disclaimer.

(21) Appl. No.: 09/943,219

(22) Filed: Aug. 29, 2001

(65) Prior Publication Data

US 2002/0054366 A1 May 9, 2002

(30) Foreign Application Priority Data

Aug. 30, 2000 (JP) .............................. 2000-260246
Aug. 30, 2000 (JP) .............................. 2000-260247

(51) Int. Cl.
*G06F 3/12* (2006.01)

(52) U.S. Cl. .................... 358/1.15; 358/444; 358/404; 358/468; 379/100.06

(58) Field of Classification Search ................ 358/400, 358/404, 405, 296, 468, 441, 1.14, 1.15, 358/1.9, 442, 444, 462, 402, 437; 379/100.01, 379/100.06, 93.09; 455/566, 426.1; 399/9, 399/8, 42; 725/24; 709/246
See application file for complete search history.

(56) References Cited

U.S. PATENT DOCUMENTS

| | | | | |
|---|---|---|---|---|
| 4,638,368 A | * | 1/1987 | Shimizu et al. ............. | 358/462 |
| 4,920,427 A | * | 4/1990 | Hirata ........................ | 358/437 |
| 5,128,985 A | * | 7/1992 | Yoshida et al. .......... | 379/93.09 |
| 5,333,062 A | | 7/1994 | Hara et al. | |
| 5,555,104 A | * | 9/1996 | Todaka ........................ | 358/468 |
| 5,675,421 A | * | 10/1997 | Ouchi ......................... | 358/402 |
| 5,717,493 A | * | 2/1998 | Ozawa et al. ................ | 358/403 |
| 5,719,619 A | * | 2/1998 | Hattori et al. ................. | 725/24 |
| 5,778,279 A | * | 7/1998 | Kawai et al. .................. | 399/42 |
| 5,956,155 A | * | 9/1999 | Nakamura et al. ........... | 358/442 |
| 6,055,067 A | * | 4/2000 | Matsuda et al. ............. | 358/468 |
| 6,141,695 A | * | 10/2000 | Sekiguchi et al. ........... | 709/246 |
| 6,198,948 B1 | * | 3/2001 | Sudo et al. .................. | 455/566 |
| 6,252,672 B1 | * | 6/2001 | Sugawara et al. .......... | 358/1.15 |

(Continued)

FOREIGN PATENT DOCUMENTS

EP        0 901 275        3/1999

(Continued)

*Primary Examiner*—Kimberly Williams
*Assistant Examiner*—Beniyam Menberu
(74) *Attorney, Agent, or Firm*—Hogan & Hartson LLP (57) ABSTRACT

A communication terminal capable of preventing a circuit from being released when a hook key is operated in the case the circuit is being closed forcibly. The communication terminal is capable of informing the functions capable of being used in the case the circuit is being closed due to the malfunction of the recording unit. If a recording unit fails to operate and the image memory is exhausted, and when it is set to close the telephone line based on the operation of the circuit closing key, the facsimile receiving is prevented from being carried out by closing the telephone line. The operation of the hook key is invalidated under this condition. Therefore, the telephone line is not released even if the hook key is operated. Thus, when the telephone line is being closed forcibly, the telephone line L is not released even if the hook key is operated.

18 Claims, 8 Drawing Sheets

U.S. PATENT DOCUMENTS

| | | |
|---|---|---|
| 6,414,759 B1 * | 7/2002 | Ikegami et al. ............. 358/444 |
| 6,427,004 B1 * | 7/2002 | Minamizawa et al. . 379/100.06 |
| 6,434,343 B1 * | 8/2002 | Kobayashi et al. ............ 399/8 |
| 6,701,095 B1 * | 3/2004 | Fujimoto et al. ............... 399/9 |
| 6,728,534 B1 * | 4/2004 | Izumi et al. ............. 455/426.1 |
| 2002/0057773 A1 * | 5/2002 | Fujise et al. ........... 379/100.01 |
| 2005/0024676 A1 * | 2/2005 | Yamagishi ................. 358/1.15 |

FOREIGN PATENT DOCUMENTS

| | | | |
|---|---|---|---|
| JP | 56-149169 | 11/1981 | |
| JP | 01318456 A | * 12/1989 | ............ 379/100.15 |
| JP | 06-244987 | 9/1994 | |

* cited by examiner

FIG. 9

COMMUNICATION TERMINAL

CROSS REFERENCES TO RELATED APPLICATIONS

This application claims priority of Japanese Patent Application No.2000-260246 and No.2000-260247 filed in JPO both on Aug. 30, 2000, the entire disclosures of which are incorporated herein by reference.

BACKGROUND OF THE INVENTION

1. Field of the Invention

The present invention relates to a communication terminal such as a facsimile machine with a copying function and more particularly which characterized in an operation when a recording unit fails to operate on the ground of a recording paper or the toner running out, or a photoconductive drum needing a replacement.

2. Description of the Related Art

In a conventional communication terminal such as a facsimile machine with a copying function, when the recording unit fails to operate on the ground of the recording paper or the toner running out, or a photoconductive drum needing a replacement, the operational status is displayed on the display. In accordance with the display, when an operator replenishes the recording paper or the toner, or when a service personnel exchanges the photoconductive drum, the recording unit becomes operable.

SUMMARY OF THE INVENTION

Even if the recording unit fails to operate likewise, when the monitor key is operated to ring the signal on the circuit from the monitor speaker by closing the circuit with the secondary telephone or the cordless handset on hooked (a situation in which the handset is not picked up), a call can be originated to the other end.

However, when the hook key for releasing the circuit is operated after operating the monitor key, the circuit is released. Therefore, when an incoming call of the facsimile communication is detected at the time being, the calling tone of the facsimile receiving is kept ringing.

Moreover, in the case the recording unit fails to operate and the alternative memory receiving cannot be carried out, the fact that the recoding unit became non-operable was informed but it was not informed whether or not the facsimile function or the telephone function is capable of being used.

Paying attention to these kinds of problems, the present invention was devised, and the object of the present invention to provide a communication terminal capable of preventing the circuit to be released even if the hook key is operated in the case the circuit is being closed forcibly. It is another object of the present invention to provide a communication terminal capable of informing the functions capable of being used even when the circuit is being closed due to the malfunction of the recording unit.

DETAILED DESCRIPTION OF THE INVENTION

Taking the facsimile machine with a copying function as an example of the communication terminal in the present invention, the embodiment will now be described in reference to the accompanying drawings.

Figure 1:
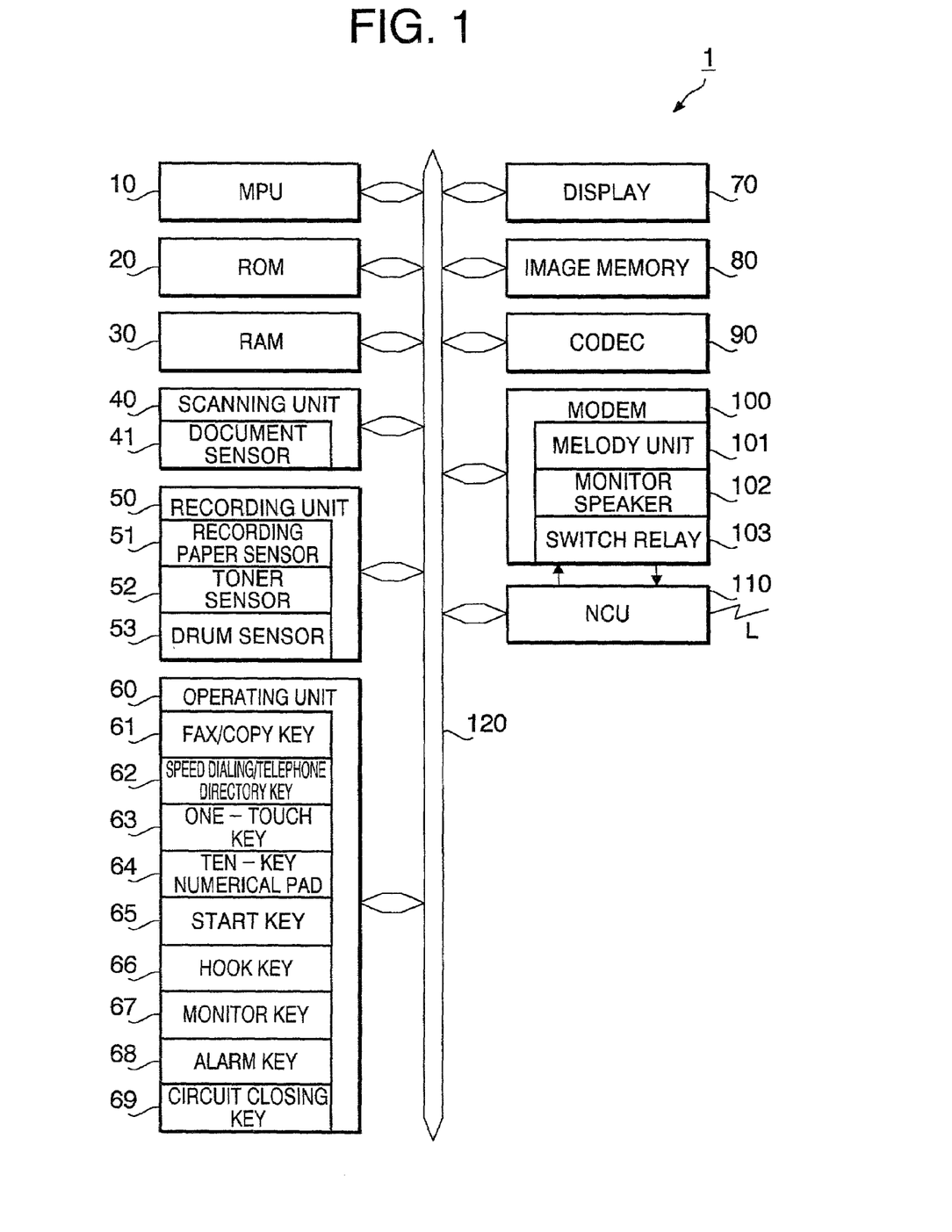
FIG. 1 is a block diagram showing the composition of a facsimile machine with a copying function.

As shown in FIG. 1, the facsimile machine 1 with a copying function includes MPU 10, ROM 20, RAM 30, a scanning unit 40, a recording unit 50, an operating unit 60, a display 70, an image memory 80, a codec 90, a modem 100 and NCU 110, and respective units 10 to 120 are connected respectively via a bus 120.

The MPU 10 controls each unit composing the facsimile machine 1 with a copying function. The ROM 20 stores various kinds of programs to control the facsimile machine 1 with a copying function. The RAM 30 stores various kinds of information related to the facsimile machine 1 with a copying function.

The scanning unit 40 scans the image on a document line-by-line, changes the image data of the read image into the binary code of black and white, and outputs the image data of one line in the binary code to the codec 90 accordingly. Moreover, the scanning unit 40 includes a document sensor 41. The document sensor 41 detects the presence or the absence of the transmitting document or the document copy of the FAX placed on the scanning unit 40, and outputs the detected signal to the MPU 10.

Figure 9:
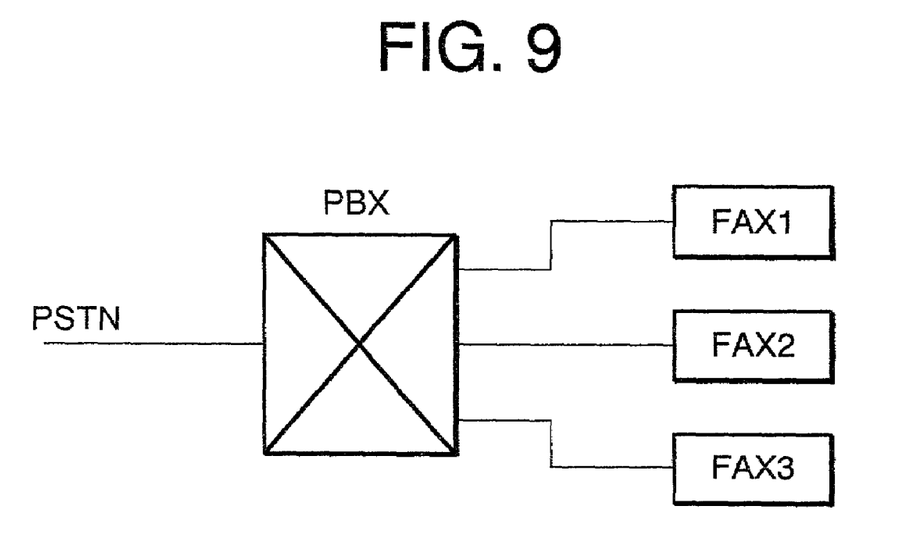
FIG. 9 is a block diagram showing the whole system.

FIG. 9 is a diagram showing an environment where a facsimile machine with a copying function of the present invention is to be used.

A plural number of facsimile machines are connected to the PBX (Private Branch Exchange). For example, when the facsimile 1 becomes incapable of recording, the facsimile 1 closes the circuit connected to the PBX (forms a current loop with the PBX). Then, the PBX judges that the facsimile 1 is in use (judges that it is about to call) since the facsimile 1 maintains the state of closing the circuit. Thus, the facsimile 1 is not called for an incoming call from the PSTN (Public Switched Telephone Network). The PBX is capable of calling another facsimile 2 (capable of recording a received call) instead.

The recording unit 50 comprised of an electro photographic image printer, records on the recording paper, a received image data from the FAX operation and an image data scanned by the scanning unit 40 in the copying operation. The recording unit 50 is also provided with a recording paper sensor 51, a toner sensor 52, and a drum sensor 53. The recording paper sensor 51 detects the presence or the absence of the recording paper stowed in the recording paper cassette, and outputs the detected signal to the MPU 10. The toner sensor 52 detects the presence or the absence of the toner stowed in the toner case, and outputs the detected signal to the MPU 10. The drum sensor 53 detects the rotation of the photosensitive drum and outputs the detected signal to the MPU 10. Then, the MPU 10 calculates the total rotating hour of the photosensitive drum with reference to the detected signal from the drum sensor 53, and judges whether or not it is the time to replace the photosensitive drum.

The operating unit 60 is provided with various kinds of operating keys such as a FAX/copy key 61, a speed dialing/ telephone directory key 62, a one-touch key 63, a ten-key numerical pad 64 (including *, # keys), a start key 65, a hook key 66, a monitor key 67, an alarm key 68 and a circuit closing key 69. The FAX/copy key 61 is used for selecting the FAX mode or the copy mode. The speed dialing/ telephone directory key 62 is used for designating a pre-registered telephone number of the other end (including a FAX number) with a speed dialing number, and for designating the telephone number of the other end by searching the pre-registered other end in the telephone directory. The one-touch key 63 is used for selecting the pre-registered other end with a single keystroke. The ten-key numerical pad 64 is used for inputting the telephone number of the other end, or the number of copies, etc. The start key 65 is used for starting the reading operation of a FAX transmitting document or a document copy. The hook key 66 is used for releasing the telephone line L. The monitor key 67 is used for ringing the dial tone or the howler tone from the exchanger by closing the telephone line L so that a call can be originated with the handset not picked up. The alarm key 68 is used for setting whether or not to output the circuit closing melody which shows the fact that the telephone line L maintains the closed state due to the malfunction of the recording unit 50. The circuit closing key 69 is used for setting whether or not to close the telephone line L in the case the recording unit fails to operate.

The display 70 comprised of LCD etc. displays various kinds of information, such as an operational status of the facsimile machine 1 with a copying function. Moreover, the display 70 displays the message that it shows the functions capable of being used even when the telephone line L maintains the closed state.

The image memory 80 temporarily stores the received image data or the image data of the image scanned at the scanning unit 40. The codec 90 performs a band compression and encoding for transmitting the image data input from the scanning unit 40 by the system such as MH, MR, MMR, or JBIG. Moreover, the codec 90 decodes the received image data.

The modem 100 modulates and demodulates the transmitted and received data according to V.17, V.27ter, V.29, etc. in reference to the facsimile transmission control procedure according to ITU-T Recommendation T.30. Moreover, the modem 100 includes the melody unit 101, the monitor speaker 102 and the switch relay 103. The melody unit 101 stores the circuit closing melody which indicates that the telephone line L maintains the closed state due to the malfunction of the recording unit 50. The monitor speaker 102 outputs the circuit closing melody from the melody unit 101, the calling tone in accordance with the calling signal from the exchanger, the dial tone or the howler tone from the exchanger. The howler tone is ringed when the handset is being picked up, or when the dial tone elapses the prescribed period of time. Moreover, the monitor speaker 102 alarms an invalid buzzer which indicates that the operation of the hook key 66 is invalid when the monitor key 67 is operated and the hook key 66 is also operated, in the case the telephone line L maintains the closed state due to the malfunction of the recording unit 50. The switch relay 103 is used for connecting alternatively to the telephone line L side to ring the dial tone or the howler tone from the monitor speaker 102, or to the melody unit 101 side to output the circuit closing melody from the monitor speaker 102.

The NCU 110 is provided with a function to close and release the telephone line L, and to detect the transmitting and incoming calls of the dial signal corresponding to the telephone number of the other end.

Figure 2:
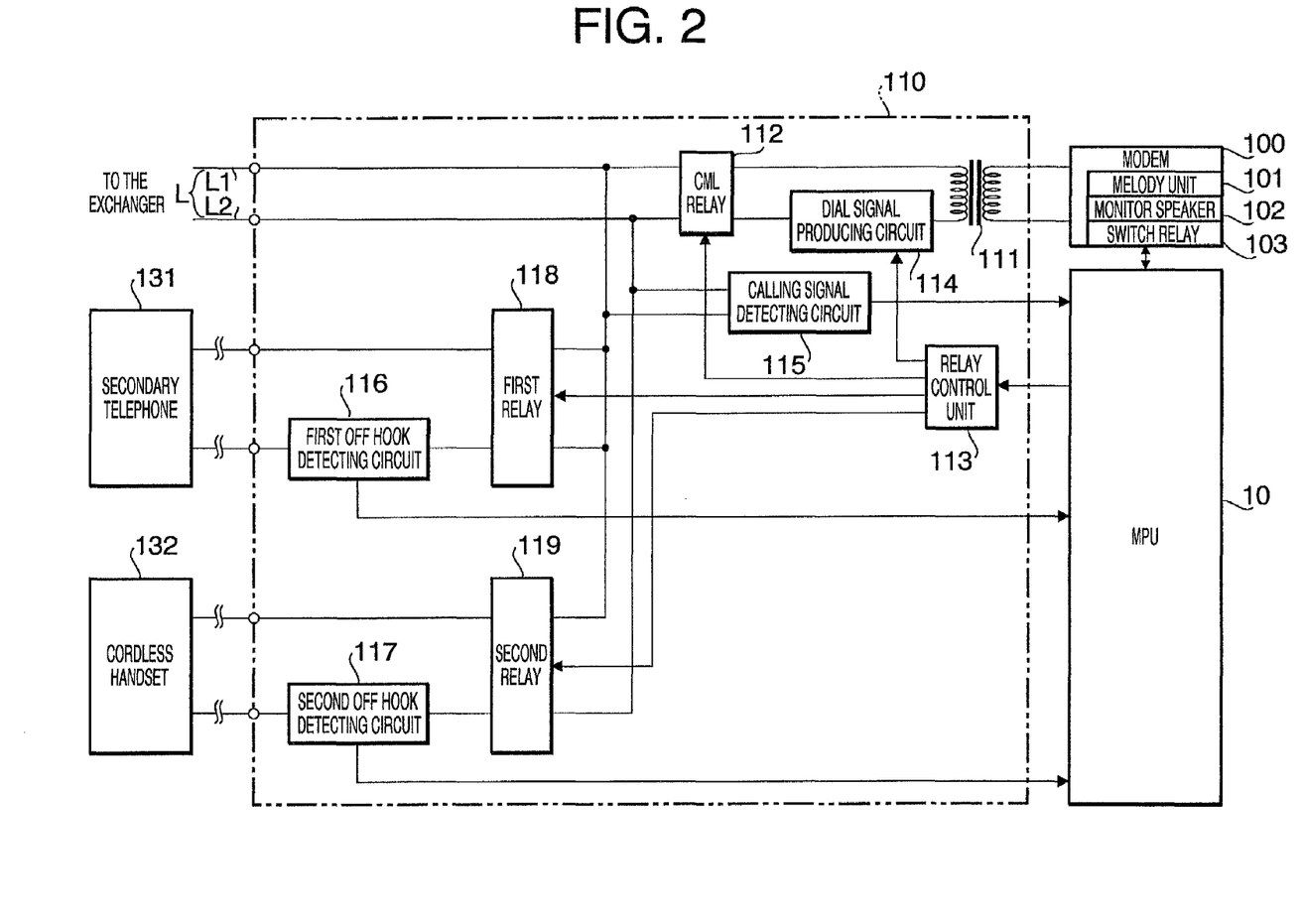
FIG. 2 is an electric circuit outline showing the composition of the NCU.

The composition of the NCU 110 will now be described.

Referring to FIG. 2, the modem 100 is connected to the telephone line L (L1, L2) via a transformer 111. The CML relay 112, placed between the telephone line L and the modem 100, closes and releases the telephone line L by the control from the relay control unit 113. The telephone line L forms a current loop via the modem 100 due to the closing of the circuit, and releases the current loop due to the releasing of the circuit. The dial signal producing circuit 114, placed between the transformer 111 and the CML relay 112, produces a dial signal by the control from the relay control unit 113.

A calling signal detecting circuit 115, connected to the telephone line L, detects a 16 (Hz) calling signal on the telephone line L and outputs the detected signal to the MPU 10. The first and the second off-hook detecting circuits 116 and 117 detect respectively the off-hook (a situation which a handset is picked up) of a secondary telephone 131 and a cordless handset 132, and outputs the detected signal to the MPU 10.

The first and the second relays 118, 119 are provided to connect the secondary telephone 131 and the cordless handset 132 respectively to the telephone line L. The relay control unit 113 controls the CML relay 112, the dial signal producing circuit 114, the first and the second relays 118, 119 with reference to the control from the MPU 10.

Referring to the flow charts shown in FIG. 3 to FIG. 6, the operation of the facsimile machine 1 with a copying function, when the recording unit 50 fails to operate, will now be described. This operation is carried out by the control of the MPU 10 according to the program stored in the ROM 20.

Figure 3:
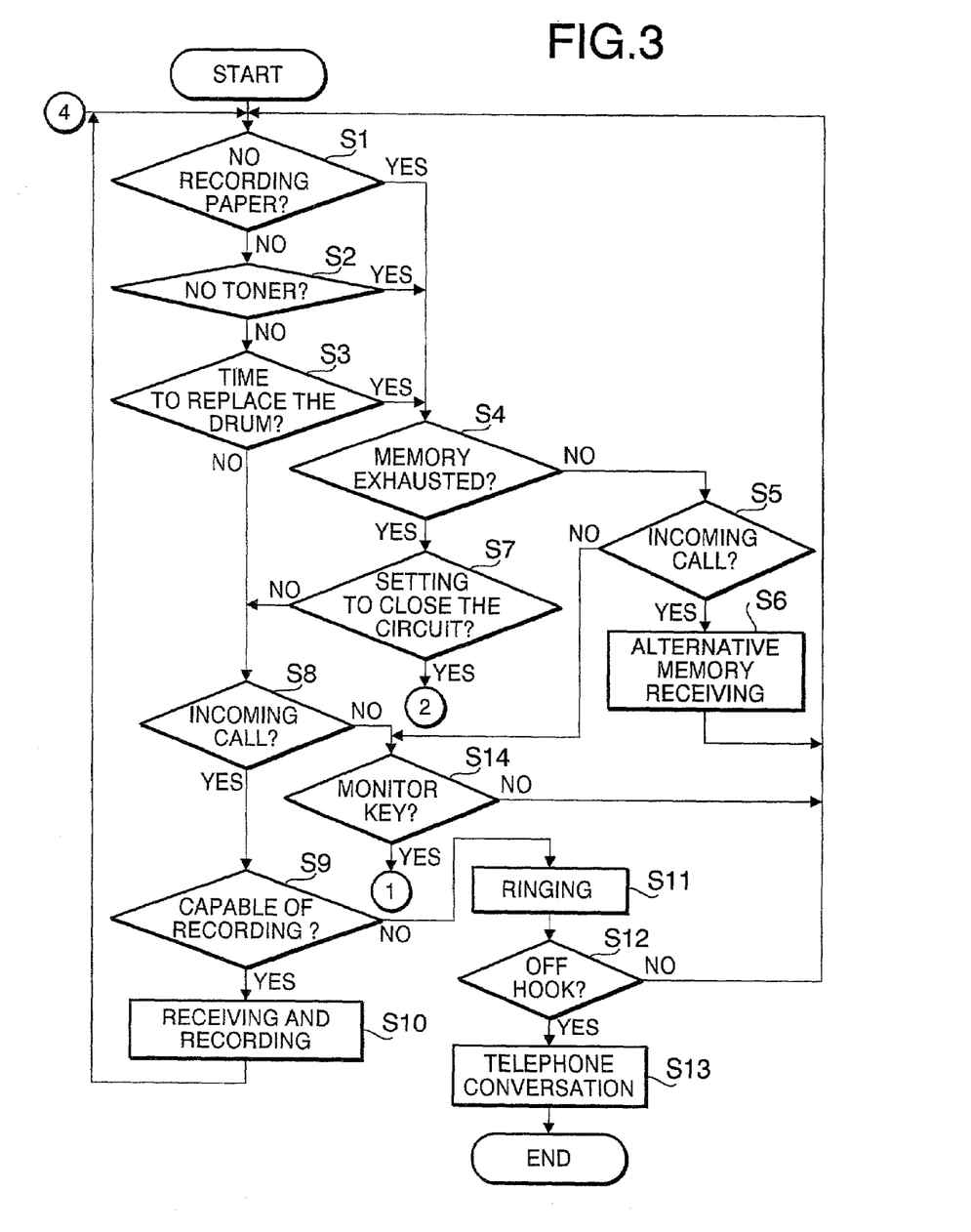
FIG. 3 is a flow chart showing the operation of the facsimile machine with a copying function in the event that the recording unit fails to operate.

In step S1, the presence or the absence of the recording paper is checked in accordance with the detected signal from the recording paper sensor 51. In the absence of the recording paper, it proceeds to step S4. On the other hand, in the presence of the recording paper, it proceeds to step S2.

In step S2, the presence or the absence of the toner is checked in accordance with the detected signal from the toner sensor 52. In the absence of the toner, it proceeds to step S4. On the other hand, in the presence of the toner, it proceeds to step S3.

In step S3, it is judged whether or not it is the time to replace the photosensitive drum, according to the detected signal from the drum sensor 53. When it is the time to replace the photosensitive drum, it proceeds to step S4. On the other hand, when it is not yet the time to replace the photosensitive drum, it proceeds to step S8.

In step S4, when the recording unit 50 becomes non-operable in such case that the recording paper or the toner has run out, or the photosensitive drum has reached the time to be replaced, it is judged whether or not the image memory 80 is exhausted. In the case the memory is exhausted, it proceeds to step S7. On the other hand, if the memory is not exhausted, it proceeds to step S5.

In step S5, it is judged whether or not an incoming call has been detected, in accordance with the detected signal from the calling signal detecting circuit 115. When an incoming call is detected, it proceeds to step S6. When the CNG signal, which shows that it is from a facsimile machine is transmitted from the other end, and the facsimile communication in reference to the facsimile transmission control procedure is started, the so-called alternative memory receiving is carried out in step S6. Once the alternative memory receiving is completed, it proceeds to the said step S1. In other words, even when the recording unit becomes non-operable in such case that the recording paper or the toner has run out in the said step S1 and S2, or the photosensitive drum has reached the time to be exchanged in the said step S3, the alternative memory receiving is carried out until the image memory 80 is exhausted. On the other hand, when an incoming call is not detected, it proceeds to step S14.

In the case the image memory 80 is exhausted in the said step S4, it is judged whether or not it is the setting to close the telephone line L in accordance with the operation of the circuit closing key 69 in step S7. When it is the setting to close the telephone line L, it proceeds to step S41 shown in FIG. 5. On the other hand, when it is the setting to not close the telephone line L, it proceeds to step S8.

In the case there is the recording paper and the toner in the said step S1 and S2, and the photosensitive drum has not yet reached the time to be replaced in the said step S3, or in the case the image memory 80 is exhausted in the said step S4 and it is set not to close the telephone line L according to the operation of the circuit closing key 69 in the said step S7, it is judged whether or not an incoming call has been detected in accordance with the detected signal from the calling signal detecting circuit 115 in step S8. When an incoming call is detected, it proceeds to step S9. On the other hand, when an incoming call is not detected, it proceeds to step S14.

In the case an incoming call is detected in the said step S8, it is judged whether or not the recording unit 50 is operable in step S9. In other words, if either of the said step S1 through step S3 is "NO", that is, when the recording unit 50 is capable of recording and an incoming call is detected in step S8, it proceeds to step S9. On the other hand, if at least one of the said step S1 through step S3 is "YES", in other words, when the recording unit 50 fails to operate and an incoming call is detected in step S8 via step S4 and step S7, it also proceeds to step S9. In other words, when it is set to not close the telephone line L in the said step S7, it proceeds to the said step S8, and when an incoming call is detected, it proceeds to step S9. Referring to the setting in the said step S7, it is judged whether or not the recording unit 50 is operable again in step S9.

In the case the recording unit 50 is operable with either of the said step S1 through step S3 "NO" and when an incoming call is detected in the said step S8, in step S10, the image data is received, the received image data is recorded on the recording paper at the recording unit 50 and it proceeds to the said step S1. In other words, when the recording unit 50 is operable, the processes of the said step S1 through step S3, step S8 through S10, are repeated. On the other hand, in the case the recording unit 50 fails to operate with at least one of the said step S1 through step S3 "YES", and in the case the image memory 80 is exhausted in the said step S4 and it is set not to close the telephone line L according to the operation of the circuit closing key 69 in the said step S7, when an incoming call is detected in the said step S8, it proceeds from step S9 to step S11.

In step S11, a calling tone is ringed from the monitor speaker 102 based on the calling signal. Thus, when it is set not to close the telephone line L in the said step S7, even when it is a facsimile receiving, since the recording unit 50 fails to operate, "NO" is selected in the said step S9 and a calling tone is ringed from the monitor speaker 102 based on the calling signal.

In step S12, it is judged whether or not the operator off hooked the secondary telephone 131 or the cordless handset 132 in accordance with the detected signal from the first or the second off hook detecting circuit 116,117. In other words, when it is off hooked in accordance with the calling tone ringed in the said step S11, it proceeds to step S13. On the other hand, when it is not off hooked, it returns to the said step S1 and the calling tone is kept ringing from the monitor speaker 102.

In step S13, when the other end is the telephone, a telephone conversation is carried out between the operator and the other end. When the telephone conversation is completed and the operator on hooks the secondary telephone 131 or the cordless handset 132 thereafter, this process is terminated.

When an incoming call is not detected in the said step S8, in step S14, it is judged whether or not the operator operated the monitor key 67. When the monitor key 67 is operated, it is judged as a calling and it proceeds to step S21 shown in FIG. 4. On the other hand, when the monitor key 67 is not operated, it proceeds to the said step S1.

Figure 4:
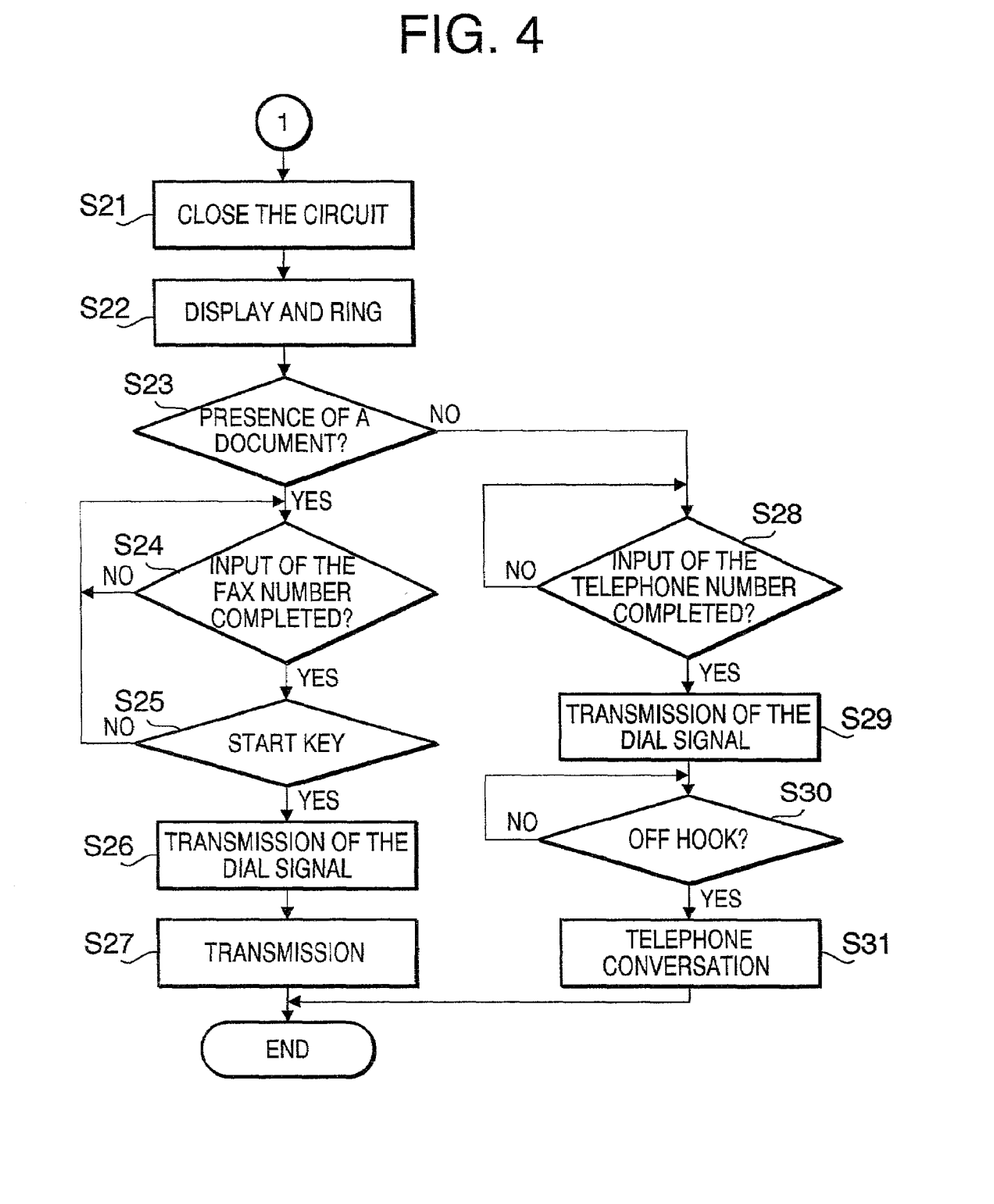
FIG. 4 is a flow chart showing the operation of the facsimile machine with a copying function in the event that the recording unit fails to operate.

In step S21 shown in FIG. 4, the telephone line L is closed by the CML relay 112 in accordance with the operation of the monitor key 67 in the said step S14.

In step S22, the message that the telephone conversation or the transmission is capable of being carried out is displayed on the display 70 and the dial tone is ringed from the monitor speaker 102.

In step S23, the presence or the absence of the transmitting document is judged in accordance with the detected signal from the document sensor 41. If there is a transmitting document, it proceeds to step S24. On the other hand, when there is no transmitting document, it proceeds to step S28.

In step S24, it is being waited until the operator finishes inputting the FAX number. Then, when the inputting of the FAX number is completed, the FAX number is stored in the RAM 30 and it proceeds to step S25.

In step S25, it is being waited until the operator operates the start key 65. Then, when the start key 65 is operated, it proceeds to step S26. On the other hand, when the start key 65 is not operated, it proceeds to the said step S24. Thus, the FAX number can be changed until the operator operates the start key 65.

In step S26, the FAX number of the other end stored in the RAM 30 is read out and the dial signal corresponding to the FAX number is transmitted to the telephone line L from the dial signal producing circuit 114.

In step S27, the process in which the image data of the image is transmitted while the image on the transmitting document is being scanned by the scanning unit 40, the so-called scanner transmission is carried out, and this process is terminated. In other words, in the case the image memory 80 is exhausted in the said step S4, the read image data cannot be stored by the image memory 80. Therefore, after the codec 90 performs a band compression and encoding on the read image data, it is directly transmitted to the other end without being stored by the image memory 80. In the case with at least one of the said step S1 through step S3 "YES", in other words, in the case the recording unit 50 fails to operate and the image memory 80 is not exhausted in the said step S4, and the monitor key 67 is operated in the said step S14 without an incoming call being detected in the said step S5, the process in which the codec 90 performs a band compression and encoding on the read image data and the data is temporarily stored in the image memory 80, read out and transmitted, the so-called memory transmission can be carried out.

In the case there is no transmitting document in the said step S23, in step S28, it is being waited until the operator finishes inputting the telephone number. Then, when the input of the telephone number is completed, the telephone number is stored in the RAM 30 and it proceeds to step S29.

In step S29, the telephone number of the other end stored in the RAM 30 is read out, and the dial signal corresponding to the telephone number is transmitted to the telephone line L from the dial signal producing circuit 114.

In step S30, it is being waited until the operator off hooks the secondary telephone 131 or the cordless handset 132, according to the detected signal from the first or the second off hook detecting circuit 116, 117. In other words, in the said step S14, since the operator operates the monitor key 67 with the secondary telephone 131 or the cordless handset 132 being on hooked to generate a call, a telephone conversation cannot be carried out unless the secondary telephone 131 or the cordless handset 132 is off hooked. Therefore, it is being waited until the operator off hooks. Then, when the operator off hooks the secondary telephone 131 or the cordless handset 132, in step S31, a telephone conversation is carried out between the operator and the other end. When the operator on hooks the secondary telephone 131 or the cordless handset 132 after the telephone conversation is completed thereafter, this process is terminated. In a facsimile machine 1 with a copying function employing a speakerphone function capable of carrying out a telephone conversation with the status of on hook, the process of step S30 can be abbreviated.

Figure 5:
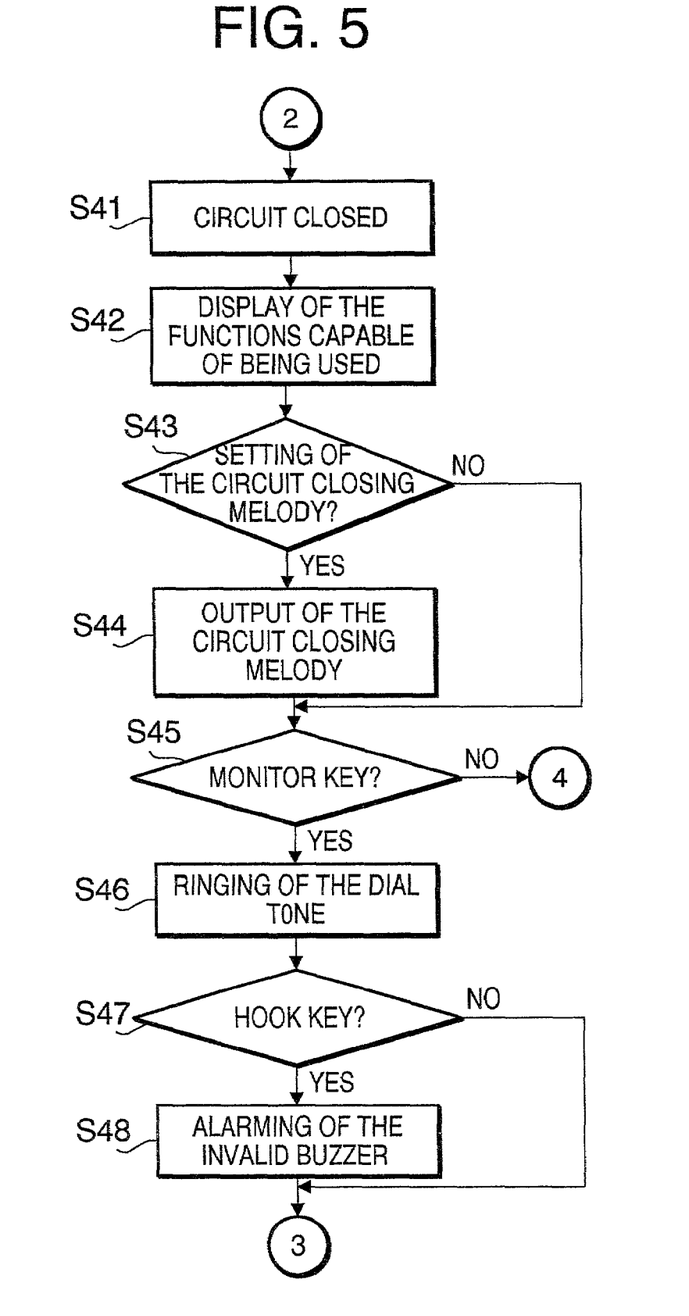
FIG. 5 is a flow chart showing the operation of the facsimile machine with a copying function in the event that the recording unit fails to operate.

When it is set to close the telephone line L according to the operation of the circuit closing key 69 in step S7 shown in FIG. 3, the telephone line L is closed by the CML relay 112 in the step S41 shown in FIG. 5. In other words, when the recording unit 50 fails to operate and the image memory 80 is exhausted, the received image data cannot be recorded on the recording paper even when there is a facsimile receiving. Therefore, the telephone line L maintains the closed state so that the facsimile receiving is not to be carried out in these cases.

In step S42, in the case the recording unit 50 fails to operate and the image memory 80 is exhausted, even if the telephone line L maintains the closed state due to the setting of closing the telephone line L based on the operation of the circuit closing key 69, the message which indicates the functions capable of being used is displayed on the display 70. For example, the message, "Due to the failure of recording and the exhaust of the memory, FAX receiving cannot be carried out but FAX transmission or telephone conversation can be carried out" is displayed.

In step S43, it is judged whether or not it is a setting to output the circuit closing melody from the monitor speaker 102 based on the operation of the alarm key 68. When it is the setting to output the circuit closing melody, the circuit closing melody is read out from the melody unit 101 and the circuit closing melody is output from the monitor speaker 102 in step S44. On the other hand, when it is the setting not to output the circuit closing melody, it proceeds to step S45.

In step S45, it is judged whether or not the operator operated the monitor key 67 to originate a call. When the monitor key 67 is operated, the dial tone is ringed from the monitor speaker 102 in step S46. On the other hand, when the monitor key 67 is not operated, it proceeds to step S1 shown in FIG. 3.

In step S47, it is judged whether or not the hook key 66 has been operated. When the hook key 66 is operated, the invalid buzzer is alarmed from the monitor speaker 102 in step S48. In other words, in the case the recording unit 50 fails to operate and the image memory 80 is exhausted, when it is set to close the telephone line L based on the operation of the circuit closing key 69, the telephone line L maintains the closed state in the said step S41. However, when the monitor key 67 is operated under this condition and the hook key 66 is operated, the CML relay 112 releases the telephone line L. Therefore, to prevent the telephone line L from being released even if the hook key 66 is operated, the operation of the hook key 66 is invalidated and the invalid buzzer is alarmed from the monitor speaker 102.

Figure 6:
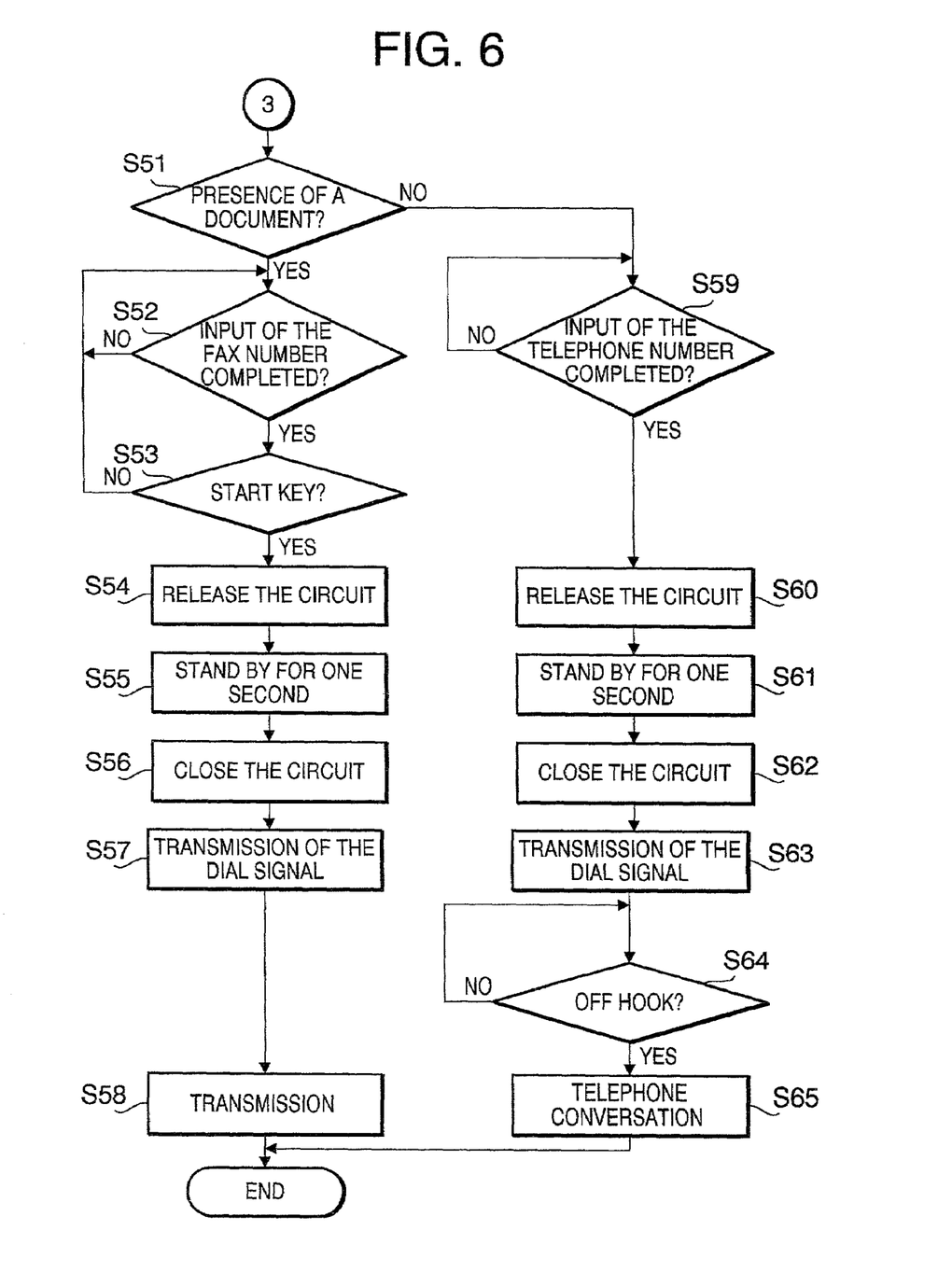
FIG. 6 is a flow chart showing the operation of the facsimile machine with a copying function in the event that the recording unit fails to operate.

In step S51 through step S53 shown in FIG. 6, the same process as in the said step S23 through step S25 shown in FIG. 4 is carried out.

In step S54, the CML relay 112 releases temporarily the telephone line L.

In step S55, it is on standby for one second with the telephone line L being released by the CML relay 112. That is, when the telephone line L is kept closed for a long period of time, the exchanger recognizes that the facsimile machine 1 with a copying function is using the telephone line L, and the dial signal from the dial signal producing circuit 114 is not to be accepted thereafter. Therefore, the telephone line L is kept released for one second by the CML relay 112.

In step S56, the telephone line L is closed again by the CML relay 112. In step S57 and step S58, the same process as in the said step S26 and step S27 shown in FIG. 4 is carried out.

In the case there is no transmitting document in the said step S51, the same process as in the said step S28 shown in FIG. 4 is carried out in step S59.

In step S60 through step S62, the same process as in the said step S54 through step S56 is carried out.

In step S63 through step S65, the same process as in the said step S29 through step S31 shown in FIG. 4 is carried out.

In the embodiment described above, when the hook key 66 is operated after operating the monitor key 67, it was constructed so that the telephone line L was not released. However, it can be constructed so that the telephone line L is not released when the secondary telephone 131 or the cordless handset 132 is off hooked after operating the monitor key 67, and the secondary telephone 131 or the cordless handset 132 is on hooked thereafter.

In addition, it can be constructed so that the telephone line L is not released when the hook key 66 is operated after the telephone conversation is carried out by on hooking the secondary telephone 131 or the cordless handset 132.

In the case the handset of the secondary telephone 131 or the cordless handset 132 is being picked up, or the telephone line L is being closed forcibly for a long period of time, the howler tone is transmitted to the facsimile machine 1 with a copying function from the exchanger. The first or the second off hook detecting circuit 116, 117 detects here the off hook of the secondary telephone 131 or the cordless handset 132. On the other hand, when the recording unit 50 fails to operate and the image memory 80 is exhausted, and it is set to close the telephone line L based on the operation of the circuit closing key 69, the telephone line L forcibly maintains the closed state. For instance, the exchanger transmits the howler tone if the telephone line L is kept closed for a long period of time. However, even if the howler tone is transmitted from the exchanger as a result of forcibly maintaining the state of closing the telephone line L for a long period of time, the facsimile machine 1 with a copying function is capable of canceling the howler tone in accordance with the detected signal from the first and the second off hook detecting circuit 116, 117. In other words, the facsimile machine 1 with a copying function is capable of ringing the howler tone from the monitor speaker 102 only in the case the howler tone is transmitted from the exchanger as a result of the handset of the secondary telephone 131 or the cordless handset 132 kept off hooked for a long period of time. Therefore, since the howler tone can only be ringed when the handset is picked up, the howler tone is not ringed even if the telephone line L is forcibly maintains the closed state. As a result, it can be prevented for the howler tone to ring more than its necessity.

Figure 7:
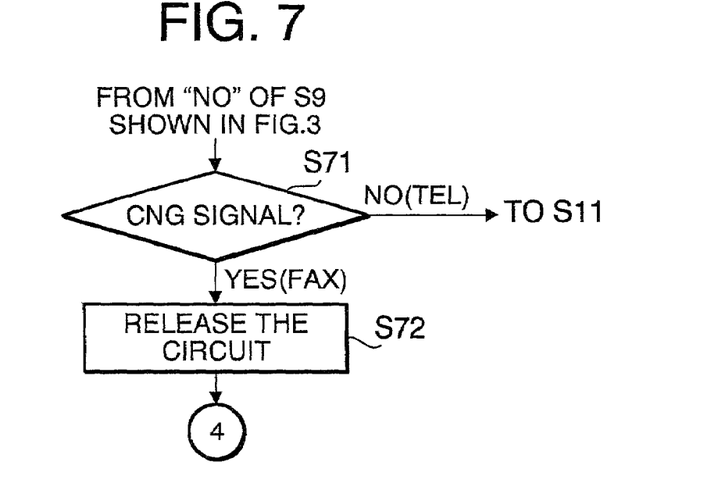
FIG. 7 is a flow chart showing the other embodiment.

The process of step S71 and step S72 shown in FIG. 7 can be added between step S9 and step S1 shown in FIG. 3. That is, when "NO" is selected in step S9, it is judged whether or not the CNG signal being transmitted from the transmitting side has been received by the modem 100 in step S71. When the CNG signal is not received by the modem 100, it is judged as an incoming call from a telephone and the calling tone is ringed from the monitor speaker 102 based on the calling signal in step S11. On the other hand, when the CNG signal is received by the modem 100, it is judged as an incoming call from a facsimile communication, the CML relay 112 releases the telephone line L in step S72 and it proceeds to step S1 shown in FIG. 3. In other words, in the case the recording unit 50 fails to operate with at least one of the step S1 through S3 shown in FIG. 3 "YES", and the image memory 80 exhausted, when it is set not to close the telephone line L based on the operation of the circuit closing key 69 in the step S7, the calling tone is kept ringing if an incoming call of the facsimile communication is detected. In such case, even when there is an incoming call of the facsimile communication, there is a need to make the calling tone, accompanying an incoming call of the facsimile communication, not to ring from the monitor speaker 102. Therefore, it is judged whether or not it is a facsimile receiving based on the CNG signal. If constructed likewise, the calling tone is ringed from the monitor speaker 102 only when an incoming call of a telephone is detected. Therefore, the calling tone is not ringed when it is an incoming call of a facsimile communication. Thus, it can be prevented for the calling tone to ring more than its necessity.

Figure 8:
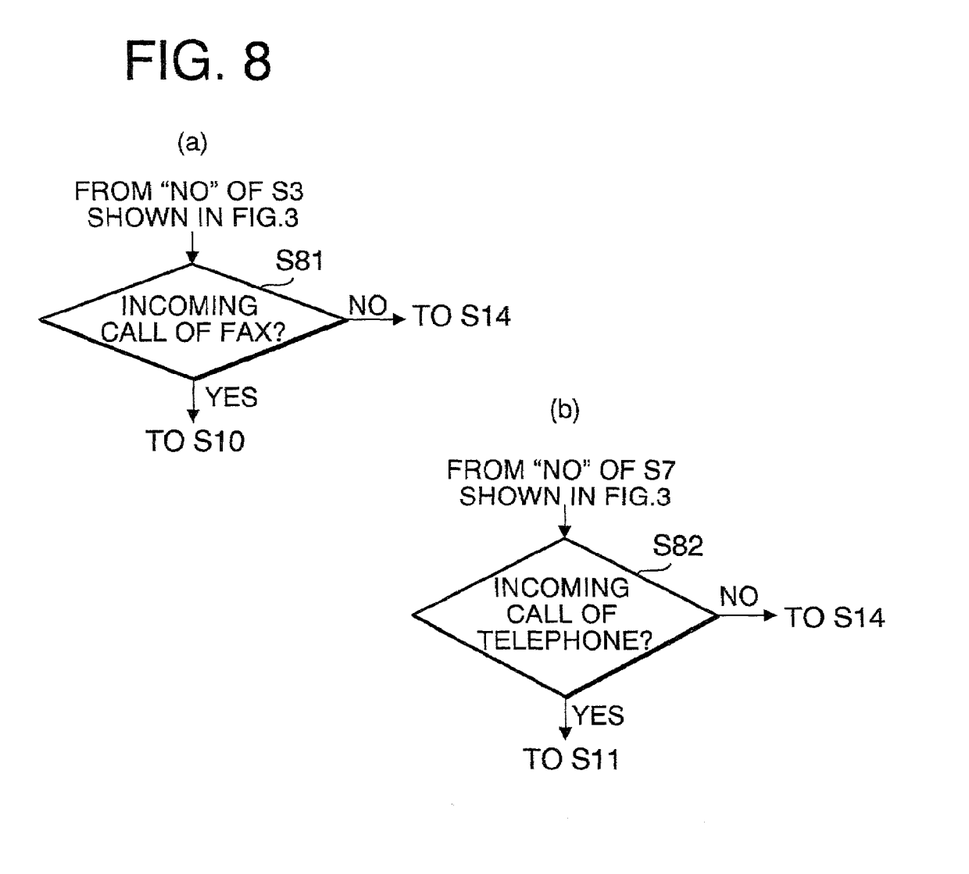
FIG. 8 is a flow chart showing the other embodiment.

A part of the process shown in FIG. 3 can be changed to the process shown in FIG. 8(*a*), (*b*). That is, when "NO" is selected in step S3 shown in FIG. 3, it is judged whether or not an incoming call of the facsimile communication has been detected based on the detected signal from the modem 100 in step S81 shown in FIG. 8(*a*). When an incoming call of the facsimile communication is detected, it proceeds to step S10 show in FIG. 3. On the other hand, when an incoming call of the facsimile communication is not detected, it proceeds to step S14. In other words, when the recording unit 50 operates, the processes of the said step S1 through S3, step S81, step S10 are repeated. When "NO" is selected in step S7 shown in FIG. 3, it is judged whether or not an incoming call of the telephone has been detected based on the detected signal from the calling signal detecting circuit 115 in step S82 shown in FIG. 8(*b*). When an incoming call of the telephone is detected, it proceeds to step S11. On the other hand, when an incoming call of the telephone is not detected, it proceeds to step S14. In other words, it is judged whether or not an incoming call of the facsimile communication in step S81 shown in FIG. 8(*a*), and an incoming call of the telephone in step S82 shown in FIG. 8 (*b*) is detected respectively. Therefore, unlike the embodiment described above, referring to the setting made in step S7 shown in FIG. 3, there is no need to judge whether or not the recording unit 50 is operable in step S9 again. Thus, a process of step S9 shown in FIG. 3 can be abbreviated.

It can be constructed to judge whether or not the photosensitive drum has reached the time to be replaced in accordance with the driving hour of the motor for rotating and driving the photosensitive drum, in the place of the drum sensor 53 which detects the rotation of the photosensitive drum.

In the embodiment described above, it was constructed so that an alternative memory receiving is carried out in step S6 until the image memory 80 becomes exhausted in step S4 in the case the recording unit becomes non-operable such that the recording paper or the toner runs out in step S1, S2 shown in FIG. 3 or that the photosensitive drum reaches the time to be replaced in step S3. However, it can be constructed to proceed to step S7 by skipping step S4 through step S6 when the recording unit fails to operate, without concerning that the image memory 80 is exhausted or not.

If constructed likewise, the image memory 80 is not to be used for storing the received image data accompanying the alternative image receiving, but is to be used for storing the read image data accompanying the memory transmission. Therefore, the case in which the image memory 80 becomes exhausted by the storing of the received image data accompanying the alternative memory receiving, and the memory transmission cannot be carried out, is prevented. Moreover, even when the FAX receiving cannot be carried out due to the malfunction of the recording unit of the facsimile machine 1 with a copying function, the received image data can be recorded by the other facsimile machine with the exchanger switching to the other facsimile machine.

In the embodiment described above, it was applied to the facsimile machine 1 with a copying function employing an image memory 80, but it can also be applied to the facsimile machine 1 with a copying function not employing an image memory 80.

In the embodiment described above, the communication terminal was applied to the facsimile machine 1 with a copying function, but it can also be applied to a communication terminal such as a facsimile machine comprising a telephone function without a copying function, or a simple facsimile machine.

Furthermore, the embodiment described above can also be changed and made more concrete as in the followings.

In the embodiment described above, it was constructed so that the invalid buzzer which indicates that the operation of the hook key 66 is invalid was alarmed from the monitor speaker 102. However, it can be constructed so that the message which indicates that the operation of the hook key 66 is invalid is displayed on the display 70.

In addition, it can be constructed so that the invalid buzzer which indicates that the operation of the hook key 66 is invalid, is alarmed from the monitor speaker 102, and the message which indicates that the operation of the hook key 66 is invalid is displayed on the display 70.

In the embodiment described above, it was set to close the telephone line L based on the operation of the circuit closing key 69 when the recording unit 50 fails to operated and the image memory 80 is exhausted. Therefore, it was constructed so that the message, "Due to the recording failure and the exhaust of the memory, FAX receiving cannot be carried out but FAX transmission or telephone conversation can be carried out," is displayed on the display 70 as a message to indicate that the telephone line L maintains the closed state (step S42 shown in FIG. 5). However, it can be constructed to also display the message, "The hook key 66 cannot be used," on the display 70. If constructed likewise, the operator is informed that the hook key 66 cannot be used by referring to the display.

The embodiment described above can also be changed and made more concrete as in the followings.

In the embodiment described above, it was constructed to display the message which indicates the functions capable of being used even when the telephone line L maintains the closed state, on the display 70 (step S42 shown in FIG. 5). However, it can be constructed to output the voice message from the monitor speaker 102 to indicate this matter. If constructed likewise, the operator can be informed which function is capable of being used even if the telephone line L is being closed, by listening to the voice message.

In addition, it can be constructed to display on the display 70 the message which indicates the functions capable of being used even if the telephone line L maintains the closed state, and to output the voice message from the monitor speaker 102 which indicates the functions capable of being used even if the telephone line L maintains the closed state.

The circuit closing melody output in step S44 can be the same as the holding melody which is output when holding the outside line or the extension. That is, the melody unit 101 is storing the holding melody. If constructed likewise, there is no need to have the circuit closing melody stored in the melody unit 101 by using the holding melody as a substitute for the circuit closing melody.

In addition, the circuit closing melody can be different from the holding melody. If constructed likewise, the circuit closing melody in the case the telephone line L maintains the closed state due to the malfunction of the recording unit 50, the holding melody in the case the outside line and the extension is held, is output respectively. Therefore, the operator can judge the operational status of the facsimile machine 1 with a copying function with the differences in the melody.

According to the embodiment described above in detail, the following action and effects can be expected.

In the case the recording unit 50 fails to operate and the image memory 80 is exhausted, and it is set to close the telephone line L based on the operation of the circuit closing key 69, the facsimile receiving is prevented from being carried out by having the telephone line L maintain the closed state. Then, the operation of the hook key 66 is invalidated under this condition. Therefore, the telephone line L is not released even if the hook key 666 is operated. Thus, when the telephone line L forcibly maintains the closed state, it is prevented from the telephone line L being released even if the hook key 66 is operated.

(2) In addition, when the telephone line L forcibly maintains the closed state and the hook key 66 is operated, the invalid buzzer is alarmed from the monitor speaker 102. Therefore, the fact that the operation of the hook key 66 is invalid can be informed to the operator for sure.

(3) In the case the recording unit 50 fails to operate and the image memory 80 is exhausted, and when it is set to close the telephone line L based on the operation of the circuit closing key 69, the facsimile receiving is prevented from being carried out by maintaining the state of closing the telephone line L. Then, the message which indicates the functions capable of being used even if the telephone line L maintains the closed state is displayed on the display 70. Therefore, even in the case the recording unit 50 fails to operate and the image memory 80 is exhausted, and the telephone line L maintains the closed state due to the setting to close the telephone line L based on the operation of the circuit closing key 69, the functions capable of being used can be informed.

(4) In addition, in the case the recording unit 50 fails to operate and the image memory 80 is exhausted and when it is set to close the telephone line L based on the operation of the circuit closing key 69, and when it is set to output the circuit closing melody based on the operation of the alarm key 68, the circuit closing melody is output from the monitor speaker 102. Therefore, even if the operator is away from the facsimile machine 1 with a copying function, the operator can be informed with the fact that the telephone line L maintains the closed state for sure.

According to the invention mentioned, when the circuit forcibly maintains the closed state, even if the operating means is operated, it can be prevented from the circuit being released.

According to the invention mentioned, even when the circuit maintains the closed state due to the malfunction of the recording means, the functions capable of being used can be informed.

What is claimed is:

1. A communication terminal comprising:
    a network control unit for closing and releasing a circuit;
    an operating key for making the network control unit release the circuit;
    a recording unit for recording image data in a recording medium; and
    a control unit which refuses an incoming call by maintaining the state of closing the circuit with the network control unit and invalidates the operation and input of the said operating key in the case the recording unit fails to operate.

2. A communication terminal according to claim 1 comprising:
    an informing means for informing the fact that the operation of the said operating key is invalid.

3. A communication terminal according to claim 2 characterized in that the fact that the operation is invalid is informed when the operating key is operated.

4. A communication terminal according to claim 1, comprising:
    a setting means for setting whether or not the circuit is to be closed when the recording unit fails to operate,
    wherein the control unit makes the network control unit close the circuit according to a setting of the setting means in the case the recording unit fails to operate.

5. A communication terminal according to claim 3 characterized in that the informing means is a buzzer.

6. A communication terminal according to claim 3 characterized in that the informing means is the display.

7. A communication terminal comprising:
    a network control unit for closing and releasing a circuit;
    an operating key for making the network control unit release the circuit;
    an informing unit;
    a recording unit for recording image data in a recording medium; and
    a control unit which refuses an incoming call by maintaining the state of closing the circuit with the network control unit and informs functions capable of being used on the informing unit, in the case the recording unit fails to operate.

8. A communication terminal comprising:
a network control unit for closing and releasing a circuit;
an operating key for making the network control unit release the circuit;
a display;
a recording unit for recording image data in a recording medium; and
a control unit which refuses an incoming call by maintaining the state of closing the circuit with the network control unit and displays functions capable of being used on the display, in the case the recording unit fails to operate.

9. A communication terminal according to claim 8 characterized in that a message, which indicates that a facsimile transmission or a telephone is capable of being carried out, is displayed.

10. A communication terminal comprising:
a network control unit for closing and releasing a circuit;
an operating key for making the network control unit release the circuit;
a speaker;
a recording unit for recording image data in a recording medium; and
a control unit which refuses an incoming call by maintaining the state of closing the circuit with the network control unit and outputs a melody which indicates the closing of the circuit, from the speaker, in the case the recording unit fails to operate.

11. A communication terminal according to claim 10, further comprising:
a setting means for setting whether or not the melody, which indicates the closing of the circuit, to be output,
wherein the control unit outputs from the sneaker the said melody based on a setting of the setting means.

12. A communication terminal according to claim 7 characterized in that the functions capable of being used is informed in a voice message.

13. A communication terminal according to claim 11 characterized in that the circuit closing melody of which is different from the melody of the holding melody output when holding a telephone conversation, is output from the speaker.

14. A communication terminal according to claim 1 characterized in that the control unit maintains the state of closing the circuit with the network control unit when the recording unit fails to operate and a image memory is overflowed, comprising:
said image memory.

15. A communication terminal according to claim 7 characterized in that the control unit maintains the state of closing the circuit with the network control unit when the recording unit fails to operate and a image memory is overflowed, comprising:
said image memory.

16. A communication terminal according to claim 8 characterized in that the control unit maintains the state of closing the circuit with the network control unit when the recording unit fails to operate and a image memory is overflowed, comprising:
said image memory.

17. A communication terminal according to claim 10 characterized in that the control unit maintains the state of closing the circuit with the network control unit when the recording unit fails to operate and a image memory is overflowed, comprising:
said image memory.

18. A communication terminal according to claim 1 characterized in that the operating key for releasing the circuit is a hook key.

* * * * *